May 26, 1936.　　　　P. B. LEVITT　　　　2,042,009
ELECTRICAL TESTING APPARATUS
Filed Dec. 31, 1934
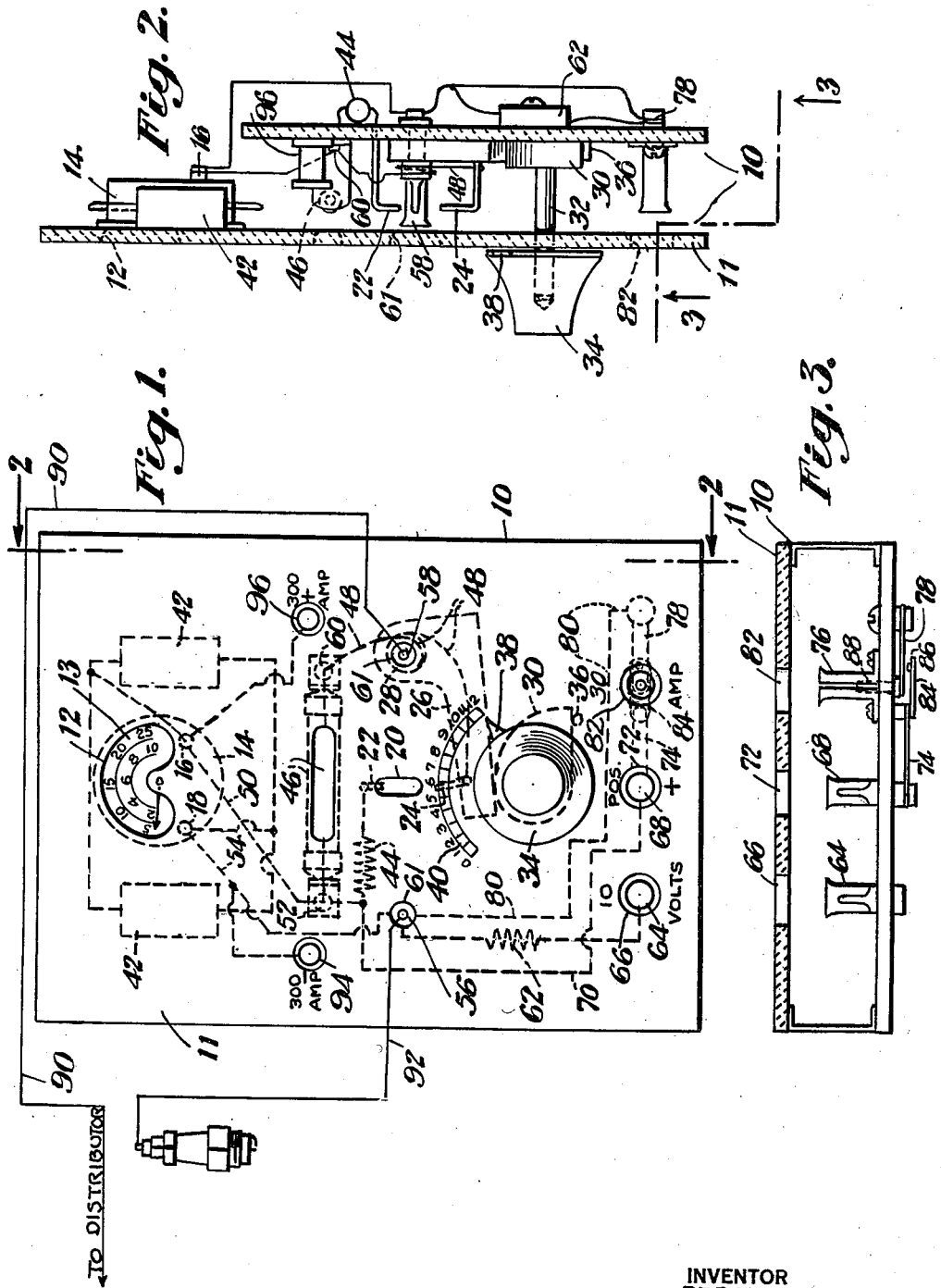
INVENTOR
PERCY B. LEVITT
BY Edmund G. Borden
ATTORNEY Patented May 26, 1936

2,042,009

UNITED STATES PATENT OFFICE 2,042,009

ELECTRICAL TESTING APPARATUS

Percy Bigmore Levitt, Bayside, N. Y., assignor to Doherty Research Company, New York, N. Y., a corporation of Delaware Application December 31, 1934, Serial No. 759,835

3 Claims. (Cl. 175—183)

This invention relates to electrical testing apparatus, and more particularly to an improved design of apparatus for testing the electrical system of automobiles.

The primary object of the present invention is to provide a simple form of apparatus adapted for testing the electrical systems of automobiles for the purpose of locating defects in the high and low tension circuits. With the above and other objects and features in view, the invention consists in the improved design of electrical testing apparatus which is hereinafter described and particularly defined by the accompanying claims.

The invention will now be described by reference to the accompanying drawing, in which:

Fig. 1 is a top plan view of the apparatus in which most of the elements and connecting wires are indicated by dotted lines;

Fig. 2 is a side view of the apparatus in vertical section, taken on the plane 2—2 of Fig. 1;

Fig. 3 is an end view of part of the apparatus in vertical section, taken on the line 3—3, Fig. 2.

In the drawing (Fig. 1) 10 indicates a shock proof bakelite case the top panel 11 of which is provided with an aperture 12 contoured to show the scale 13 of a d'Arsonval milliammeter 14. The scale of the milliammeter may be graduated in volts (from zero to 10) and in amperes (from zero to 30). The milliammeter is provided with positive and negative terminals respectively designated 16 and 18. 20 designates an aperture in the top of case 10 beneath which is mounted a variable spark gap having a stationary point 22 and a movable point 24 which is mounted on a bakelite crank arm 26 which is in turn pivotally mounted on a crank pin 28. Crank 26 is actuated to adjust the gap separating points 22 and 24 by means of a cam 30 which is rotatably mounted on a shaft 32 for actuation from a knob 34 mounted on the front panel of casing 10. A stop pin 36 is mounted in position to limit the throw of cam 30, and an indicating needle 38 is attached to knob 34 for the purpose of showing the distance separating points 22 and 24 as measured by a millimeter scale 40 located on the panel adjacent pointer 38.

The milliammeter 14 is shunted preferably by two condensers 42. Likewise a protective resistance 44 is connected in series with the spark gap, and a neon tube 46 is shunted across the combination of spark gap and protective resistance 44. A piece of relatively heavy spring wire 48 is used as the connecting lead between spark gap point 24 and the neon tube, and this wire is wrapped with one or more turns about crank pin 28 in order to serve as a spring for holding crank 26 in engagement with cam 30.

A lead wire 50 forms a permanent connection between positive terminal 16 of the milliammeter and the junction 52 of the protective resistance 44 and neon tube 46. A wire 54 forms a permanent connection between the negative terminal 18 of the milliammeter and one jack 56 of a pair of high tension pin-jacks 56—58, while the wire 48 forms a permanent connection between the other jack 58 and the junction 60 between the variable spark gap and the neon tube. Apertures 61 in the front panel provide access for inserting terminal lead pins into jacks 56 and 58.

A calibrated resistance 62 is mounted as shown with one of its terminals permanently connected to the negative terminal 18 of the milliammeter 14 and the other terminal connected to a low voltage pin-jack 64. The connection of resistance 62 to terminal 18 is advantageously made as shown by tying the resistance terminal to high tension pin-jack 56 which is in turn connected to terminal 18 by wire 54. Access to pin-jack 64 is afforded by an aperture 66 in the front panel, and this aperture bears the designation "10 volts" on the front panel. A second low voltage pin-jack 68 is permanently connected by a wire 70 to the positive terminal 16 of the milliammeter, this connection being preferably made, as shown, through junction 52 and wire 50. Access to pin-jack 68 is afforded by an aperture 72 in panel 11, which aperture bears the designation "Pos.+".

A calibrated shunt 74 is permanently connected to pin-jack 68 and also to a third pin-jack 76, while a leaf 78 of a switch 86 is permanently connected by a wire 80 to the negative terminal 18 of the galvanometer. This last connection is advantageously made, as shown, through pin-jack 56 and wire 54. Access to pin-jack 76 is afforded by an aperture 82 in panel 11, which aperture bears the designation "30 Amp." spring leaf 78 and a second spring leaf 84 connected to shunt 74 are assembled as shown in the form of a switch 86 which is normally held open by the spring action of leaf 78, but closed by the insertion of a pin into pin-jack 76 whereby an insulation plunger 88 is depressed to effect contact between the free end of leaf 78 and the free end of leaf 84. The members 78 and 84 are essentially the contact elements of switch 86 whereby contact is made and broken between the shunt 74 and the negative terminal of milliammeter 14.

The various parts of the apparatus are advantageously calibrated as follows when used for checking the electrical system of automobiles.

Milliammeter 14 should have a resistance of 50 ohms and require a current of two milliamperes to cause full scale deflection of its coil. Each of condensers 42 should have a capacity of one half micro-farad. Scale 40 of the spark gap should be graduated from 0–12 millimeters, and the protective resistance 44 should be approximately 1500 ohms. Resistance 62 should be of such magnitude that when placed in series circuit with the milliammeter the full scale reading of the milliammeter corresponds to 10 volts. In other words resistance 62 is calibrated to 4950 ohms when used with a milliammeter 14 of 50 ohms resistance. Shunt 74 should have a resistance of such magnitude that when connected in parallel with the milliammeter a current of 30 amperes passing through the shunt will cause a full scale deflection of the milliammeter. Thus the shunt should have a resistance of 1/300 of an ohm when used with a milliammeter of 50 ohms resistance.

In using the apparatus for testing the high and low tension circuits of automobile electrical systems to locate defects, the operator needs only one set of terminal wires 90 and 92 with suitable pin jack connections for making all the necessary tests. All terminal connections are plainly marked on the front panel 11 of the tester. The preferred method of carrying out a test involves first determining whether sufficient current is being delivered to the spark plugs, and when insufficient current is indicated checking back through the ignition system until the fault is found.

To ascertain whether sufficient current is being delivered to the spark plugs, one end of each of the terminal wires 90 and 92 is inserted in one of the corresponding high tension pin-jacks 56 and 58, and the instrument is placed in series with a spark plug by connecting one of the terminal wire 90 or 92 to the spark plug lead and connecting the other terminal wire to the plug. The engine of the automobile is started and operated at a speed of approximately 800 R. P. M. corresponding to about 15 miles per hour. The reading of the milliammeter 14 should be about ⅕th of full scale, or opposite the mark designating two volts on the volt scale if sufficient current is being delivered to the plug. This test should be repeated for the spark plug of each cylinder. If the spark plugs of some of the cylinders shows a current delivery which swings the meter needle below the mark indicating two volts on the volt scale, the connections and lead wires to these plugs should be repaired or replaced. When the current delivered to all of the cylinders moves the meter needle below the mark indicating two volts on the volt scale it is evident that the main current supply is inadequate. To ascertain where the fault lies, the instrument is then connected in series between the coil and distributor. With the variable spark gap 22—24 closed, meter 14 should give a reading opposite a graduation on the volt scale equal to approximately one and one-half times the number of cylinders in the engine under test. Then the gap should be gradually opened to five millimeters on the scale 40, and with this gap, the motor should run smoothly with the meter needle steady. If this test is poor as indicated by misfiring of the motor and oscillation of the meter needle, the trouble must lie in the coil or in the primary circuit. If the test is satisfactory, the trouble is evidently in the distributor or wiring.

To test the primary circuit the ends of the terminal wires 90 and 92 are placed in the low voltage jacks designated "10 volts" and "Pos.+". One of the wires is connected to ground and the other to the primary or battery lead to the coil. With the motor stationary, the ignition switch on and the distributor points open, the meter 14 should give a reading of six volts. With the distributor points closed, the meter reading should still be six volts. The terminal wires 90 and 92 are now inserted in the pin-jacks marked "Pos.+" and "30 Amp." and the instrument is connected in series in the primary circuit. With the distributor points closed, the meter indicates the coil current, which should read between 3 and 5 amperes. If the meter reads less than 3 amperes the coil should be considered inadequate and should be replaced.

If the meter reading indicated less than 6 volts delivered to the primary or battery lead of the coil, the trouble is indicated as lying in the primary circuit and the following test should be made. Insert one end of each of the wires 90 and 92 into the low tension pin jacks marked "10 volts" and "Pos.+", connect one terminal wire to ground and the other to the generator cut out terminal. The meter should read 6 volts when thus connected in a 6 volt system, or the reading should be a maximum when connected in a 12 volt system. When the motor is turned over by means of the starter with the ignition switch off, the meter should read at least 4 volts in a 6 volt system. The meter reading should now be taken with the motor running. On increasing the motor speed to 15 miles per hour, the indicated voltage should rise to from 6 to 7 volts depending on the condition of the battery. This rise in voltage indicates that the generator is charging properly and that the cutout operates properly.

To check the generator charging rate, the terminal wires 90 and 92 should be inserted in the pin jacks marked "30 Amp." and "Pos.+". The live wire should be disconnected from the generator cutout and the instrument should be placed in series with the cutout terminal and the live wire. With this connection a zero meter reading should be obtained. The engine should then be started and the engine speed increased slowly so that the meter needle will gradually swing to the right, indicating the charging amperes on the ampere scale. The average charging current should be 15 amperes. On comparing this meter reading with the reading of the ammeter on the dash board of the car, the dash board instrument should read 3 amperes less than the meter of the instrument for single coil cars, and 5 amperes less for double coil cars, when operating the engine at a speed equivalent to 20 miles per hour.

To test the polarity of the coil the instrument is connected in series with the high tension coil wire, and with the variable gap 22—24 closed, the motor is run at a speed equivalent to 15 miles per hour. After observing the reading of meter 14, the spark gap is gradually opened until the engine begins to miss, and the spacing of the spark gap is then noted from the dial 40. The motor is then stopped and the low tension connections on the coils are reversed. The above procedure is repeated and the highest meter reading indicates the correct low tension polarity.

To test the wiring, one terminal wire of the instrument is connected to ground, the spark gap 22—24 is opened wide, and the other terminal wire of the instrument is traced along the high tension wire circuit. Any leaks in the wiring system will be indicated by a pronounced flash in the neon tube 46.

To test the condition of the spark plugs, the terminal wires are connected with the high tension pin-jacks 56 and 58, and with the spark gap 22—24 closed, one terminal wire of the instrument is grounded and the other is connected to the spark plug terminal of #1 cylinder. The engine is started and operated at a speed equivalent to about 15 miles per hour. With the spark gap closed, there is no resistance and current will flow through the instrument to ground thereby shorting the plug and causing the engine to miss. The spark gap 22—24 is now gradually opened until the cylinder begins to fire regularly. This occurs when the resistance of the variable spark gap exceeds the resistance in the spark plug circuit. This test should be repeated for all of the cylinders. All of the cylinders should then be corrected to correspond with the cylinder which fires with the smallest gap opening. This can be accomplished by correcting all loose or corroded terminals, and cleaning and adjusting the gaps of the spark plugs.

The instrument may also be used for determining the current delivered to the starting motor, by inserting a 300 ampere-100 millivolt shunt in series with the starting motor, and by connecting terminal wires 90 and 92 to pin-jacks 94 and 96 of the instrument across this shunt.

The invention having been described, what is claimed is:

1. Apparatus for testing automotive electrical systems comprising a d'Arsonval milliammeter having volt and ampere graduations, a condenser shunted across the terminals of the milliammeter, a variable spark gap, a protective resistance connected in series with the spark gap, a neon tube shunted across the combination of spark gap and protective resistance, a permanent connection between the positive terminal of the milliammeter and the junction of protective resistance and neon tube, a pair of high voltage pin-jacks, a permanent connection between the negative terminal of the milliammeter and one of the high tension pin-jacks, and a permanent connection between the other high tension pin-jack and the junction of the neon tube and the variable spark gap; together with a low voltage pin-jack, a calibrated resistance one terminal of which is connected to the negative terminal of the milliammeter and the other terminal of which is connected to the low voltage pin-jack, a calibrated shunt, a second low voltage pin-jack connected to the positive terminal of the milliammeter and to one terminal of the calibrated shunt, a third pin-jack, a switch having two contact elements each connected to a separate terminal, together with an actuating pin connected to one contact element and journaled in the third pin-jack in position for displacement by insertion of a pin therein, the other terminal of such shunt being connected to the third pin-jack and to one terminal of the switch, and a permanent connection between the other terminal of the switch and the negative terminal of the milliammeter, said switch being normally held open by the spring setting of one contact element and closed by the insertion of a pin in said third jack.

2. Apparatus of the type defined in claim 1, in which the milliammeter has a resistance of approximately 50 ohms and requires a current of two milliamperes to cause full scale deflection of its coil, and in which the calibrated resistance is of such magnitude that when placed in series circuit with the milliammeter the full scale reading of the milliammeter corresponds to 10 volts; and in which the shunt has a resistance of such magnitude than when connected in parallel with the milliammeter a current of 30 amperes passing through the shunt will cause a full scale deflection of the milliammeter.

3. Apparatus of the type defined by claim 1, in which the milliammeter is shunted by two condensers each having a capacity of ½ micro-farad, and in which the protective resistance in series with the spark gap is 1500 ohms, and in which the milliammeter resistance is 50 ohms, the calibrated resistance 4950 ohms, and the resistance of the calibrated shunt is 1/300th of an ohm.

PERCY BIGMORE LEVITT.